United States Patent
Hubauer et al.

(10) Patent No.: US 9,449,275 B2
(45) Date of Patent: Sep. 20, 2016

(54) ACTUATION OF A TECHNICAL SYSTEM BASED ON SOLUTIONS OF RELAXED ABDUCTION

(75) Inventors: Thomas Hubauer, München (DE); Steffen Lamparter, Feldkirchen (DE)

(73) Assignee: SIEMENS AKTIENGESELLSCHAFT (DE)

(*) Notice: Subject to any disclaimer, the term of this patent is extended or adjusted under 35 U.S.C. 154(b) by 198 days.

(21) Appl. No.: 14/232,315

(22) PCT Filed: Jul. 2, 2012

(86) PCT No.: PCT/EP2012/062815
§ 371 (c)(1),
(2), (4) Date: Jan. 13, 2014

(87) PCT Pub. No.: WO2013/007547
PCT Pub. Date: Jan. 17, 2013

(65) Prior Publication Data
US 2014/0149337 A1  May 29, 2014

(30) Foreign Application Priority Data

Jul. 12, 2011 (DE) .................. 10 2011 079 034

(51) Int. Cl.
*G06F 17/00* (2006.01)
*G06N 7/00* (2006.01)
(Continued)

(52) U.S. Cl.
CPC .............. *G06N 5/02* (2013.01); *G05B 23/0278* (2013.01); *G06F 11/004* (2013.01); *G06F 17/00* (2013.01)

(58) Field of Classification Search
None
See application file for complete search history.

(56) References Cited

U.S. PATENT DOCUMENTS

| 4,656,603 A | 4/1987 | Dunn |
| 4,783,741 A | 11/1988 | Mitterauer |

(Continued)

FOREIGN PATENT DOCUMENTS

| CA | 2 421 545 | 3/2002 |
| CN | 1092151 A | 9/1994 |

(Continued)

OTHER PUBLICATIONS

Pino-Perez et al. "Preferences and explanation", Artificial Intelligence 149, 2003, pp. 1-30.*

(Continued)

*Primary Examiner* — Li-Wu Chang
(74) *Attorney, Agent, or Firm* — Ostrolenk Faber LLP

(57) ABSTRACT

To enable efficient abduction even for observations that are faulty or inadequately modeled, a relaxed abduction problem is proposed in order to explain the largest possible part of the observations with as few assumptions as possible. On the basis of two preference orders over a subset of observations and a subset of assumptions, tuples can therefore be determined such that the theory, together with the subset of assumptions, explains the subset of observations. The formulation as a multi-criteria optimization problem eliminates the need to offset assumptions made and explained observations against one another. Due to the technical soundness of the approach, specific properties of the set of results (such as correctness, completeness etc.), can be checked, which is particularly advantageous in safety-critical applications. The complexity of the problem-solving process can be influenced and therefore flexibly adapted in terms of domain requirements through the selection of the underlying representation language and preference relations. The invention can be applied to any technical system, e.g. plants or power stations.

20 Claims, 2 Drawing Sheets

```
1  foreach r ∈ N_R do
2  |  R(r) ← ∅;
3  foreach C ∈ N_C^⊤ do
4  |  S(C) ← {⊤ : {(∅,∅)}, C : {(∅,∅)}};
   // propagation
5  repeat
6  |  changed ← false;
7  |  foreach α ∈ T ∪ A do
   |  |  // (...)
8  |  |  if α = ∃r.A_2 ⊑ B then // CR4
9  |  |  |  foreach A_1 ∈ N_C^⊤ s.t. S(A_1) ∋ A_2 : L_{A_1,A_2} do
10 |  |  |  |  foreach A ∈ N_C^⊤ s.t. R(r) ∋ (A, A_1) : L_{A,r,A_1} do
11 |  |  |  |  |  L ← ∅;
12 |  |  |  |  |  if S(A) ∋ B : L_{A,B} then L ← L_{A,B};
13 |  |  |  |  |  L* ← join(L, meet(L_{A_1,A_2}, L_{A,r,A_1}, α, A ⊑ B));
14 |  |  |  |  |  if L* ≠ L then
15 |  |  |  |  |  |  S(A) ← (S(A) \ {B : L_{A,B}}) ∪ {B : L*};
16 |  |  |  |  |  |  changed ← true;
   |  |  // (...)
17 until changed = false;
```

(51) Int. Cl.
*G06N 5/02* (2006.01)
*G05B 23/02* (2006.01)
*G06F 11/00* (2006.01)

(56) References Cited

U.S. PATENT DOCUMENTS

| | | | |
|---|---|---|---|
| 4,813,013 A | 3/1989 | Dunn | |
| 5,018,075 A | 5/1991 | Ryan et al. | |
| 5,293,323 A | 3/1994 | Doskocil et al. | |
| 5,631,831 A | 5/1997 | Bird et al. | |
| 5,712,960 A | 1/1998 | Chiopris et al. | |
| 5,802,256 A | 9/1998 | Heckerman et al. | |
| 5,810,747 A | 9/1998 | Brudny et al. | |
| 5,812,994 A | 9/1998 | Imlah | |
| 5,852,811 A | 12/1998 | Atkins | |
| 5,870,701 A | 2/1999 | Wachtel | |
| 5,884,294 A | 3/1999 | Kadar et al. | |
| 6,012,152 A | 1/2000 | Douik et al. | |
| 6,044,347 A | 3/2000 | Abella et al. | |
| 6,275,817 B1 | 8/2001 | Reed et al. | |
| 6,278,987 B1 | 8/2001 | Reed et al. | |
| 6,351,675 B1 | 2/2002 | Tholen et al. | |
| 6,389,406 B1 | 5/2002 | Reed et al. | |
| 6,394,263 B1 | 5/2002 | McCrory | |
| 6,505,184 B1 | 1/2003 | Reed et al. | |
| 6,529,888 B1 | 3/2003 | Heckerman et al. | |
| 6,701,516 B1 | 3/2004 | Li | |
| 6,745,161 B1 | 6/2004 | Arnold et al. | |
| 6,782,376 B2 | 8/2004 | Sato et al. | |
| 6,910,003 B1 | 6/2005 | Arnold et al. | |
| 7,181,376 B2 | 2/2007 | Fine et al. | |
| 7,313,515 B2 | 12/2007 | Crouch et al. | |
| 7,313,573 B2 | 12/2007 | Leung et al. | |
| 7,376,556 B2 | 5/2008 | Bennett | |
| 7,389,208 B1 | 6/2008 | Solinsky | |
| 7,392,185 B2 | 6/2008 | Bennett | |
| 7,421,738 B2 | 9/2008 | Harp et al. | |
| 7,450,523 B1 | 11/2008 | Robertson et al. | |
| 7,555,431 B2 | 6/2009 | Bennett | |
| 7,606,784 B2 | 10/2009 | Mathias et al. | |
| 7,613,667 B2 | 11/2009 | Coen et al. | |
| 7,624,007 B2 | 11/2009 | Bennett | |
| 7,647,225 B2 | 1/2010 | Bennett et al. | |
| 7,657,424 B2 | 2/2010 | Bennett | |
| 7,672,841 B2 | 3/2010 | Bennett | |
| 7,694,226 B2 | 4/2010 | Covannon et al. | |
| 7,698,131 B2 | 4/2010 | Bennett | |
| 7,702,508 B2 | 4/2010 | Bennett | |
| 7,720,787 B2 | 5/2010 | Pope et al. | |
| 7,725,307 B2 | 5/2010 | Bennett | |
| 7,725,320 B2 | 5/2010 | Bennett | |
| 7,725,321 B2 | 5/2010 | Bennett | |
| 7,729,904 B2 | 6/2010 | Bennett | |
| 7,730,020 B2 | 6/2010 | Leung et al. | |
| 7,783,582 B2 | 8/2010 | Doctor et al. | |
| 7,831,426 B2 | 11/2010 | Bennett | |
| 7,836,077 B2 | 11/2010 | Azvine et al. | |
| 7,873,519 B2 | 1/2011 | Bennett | |
| 7,912,702 B2 | 3/2011 | Bennett | |
| 7,962,321 B2 | 6/2011 | de Kleer | |
| 7,975,227 B2 | 7/2011 | Covannon et al. | |
| 8,010,560 B2 | 8/2011 | Becker et al. | |
| 8,024,610 B2 | 9/2011 | de Kleer | |
| 8,060,567 B2 | 11/2011 | Carroll et al. | |
| 8,065,319 B2 | 11/2011 | Ding et al. | |
| 8,078,559 B2 | 12/2011 | Talbot et al. | |
| 8,170,906 B2 | 5/2012 | Von Schweber et al. | |
| 8,229,734 B2 | 7/2012 | Bennett | |
| 8,244,821 B2 | 8/2012 | Carroll et al. | |
| 8,271,257 B2 | 9/2012 | de Kleer | |
| 8,285,438 B2 | 10/2012 | Mylaraswamy et al. | |
| 8,285,664 B2 | 10/2012 | Ylonen | |
| 8,352,277 B2 | 1/2013 | Bennett | |
| 8,375,099 B2 | 2/2013 | Carroll et al. | |
| 8,375,303 B2 | 2/2013 | Covannon et al. | |
| 8,458,229 B2 | 6/2013 | Oliver et al. | |
| 8,463,556 B2 | 6/2013 | Kaye | |
| 8,543,565 B2 | 9/2013 | Feng | |
| 8,572,290 B1 | 10/2013 | Mukhopadhyay et al. | |
| 8,607,311 B2 | 12/2013 | Becker et al. | |
| 8,660,849 B2 | 2/2014 | Gruber et al. | |
| 8,660,974 B2 | 2/2014 | Ylonen | |
| 8,666,923 B2 | 3/2014 | Ylonen | |
| 8,670,979 B2 | 3/2014 | Gruber et al. | |
| 8,670,985 B2 | 3/2014 | Lindahl et al. | |
| 8,676,904 B2 | 3/2014 | Lindahl | |
| 8,677,377 B2 | 3/2014 | Cheyer et al. | |
| 8,682,649 B2 | 3/2014 | Bellegarda | |
| 8,682,667 B2 | 3/2014 | Haughay | |
| 8,688,446 B2 | 4/2014 | Yanagihara | |
| 8,706,472 B2 | 4/2014 | Ramerth et al. | |
| 8,706,503 B2 | 4/2014 | Cheyer et al. | |
| 8,712,776 B2 | 4/2014 | Bellegarda et al. | |
| 8,713,021 B2 | 4/2014 | Bellegarda | |
| 8,713,119 B2 | 4/2014 | Lindahl | |
| 8,718,047 B2 | 5/2014 | Vieri et al. | |
| 8,719,005 B1 | 5/2014 | Lee et al. | |
| 8,719,006 B2 | 5/2014 | Bellegarda | |
| 8,719,014 B2 | 5/2014 | Wagner | |
| 8,731,942 B2 | 5/2014 | Cheyer et al. | |
| 8,743,708 B1 | 6/2014 | Robertson et al. | |
| 8,751,238 B2 | 6/2014 | James et al. | |
| 8,762,152 B2 | 6/2014 | Bennett et al. | |
| 8,762,156 B2 | 6/2014 | Chen | |
| 8,762,469 B2 | 6/2014 | Lindahl | |
| 8,768,702 B2 | 7/2014 | Mason et al. | |
| 8,768,869 B1 | 7/2014 | Rubin | |
| 8,775,442 B2 | 7/2014 | Moore et al. | |
| 8,781,836 B2 | 7/2014 | Foo et al. | |
| 8,799,000 B2 | 8/2014 | Guzzoni et al. | |
| 8,812,294 B2 | 8/2014 | Kalb et al. | |
| 8,825,642 B2 | 9/2014 | Zatkin et al. | |
| 8,839,344 B2 | 9/2014 | Becker et al. | |
| 8,862,252 B2 | 10/2014 | Rottler et al. | |
| 8,892,446 B2 | 11/2014 | Cheyer et al. | |
| 8,898,568 B2 | 11/2014 | Bull et al. | |
| 8,903,716 B2 | 12/2014 | Chen et al. | |
| 8,930,191 B2 | 1/2015 | Gruber et al. | |
| 8,935,167 B2 | 1/2015 | Bellegarda | |
| 8,942,986 B2 | 1/2015 | Cheyer et al. | |
| 8,965,818 B2 | 2/2015 | Zillner et al. | |
| 8,977,255 B2 | 3/2015 | Freeman et al. | |
| 8,996,340 B2 | 3/2015 | Cheriere et al. | |
| 8,996,376 B2 | 3/2015 | Fleizach et al. | |
| 9,047,565 B2 | 6/2015 | Willems et al. | |
| 9,053,089 B2 | 6/2015 | Bellegarda | |
| 9,075,783 B2 | 7/2015 | Wagner | |
| 9,076,448 B2 | 7/2015 | Bennett et al. | |
| 9,092,109 B2 | 7/2015 | Carroll et al. | |
| 9,117,447 B2 | 8/2015 | Gruber et al. | |
| 9,153,142 B2 | 10/2015 | Bagchi et al. | |
| 9,160,738 B2 | 10/2015 | Becker | |
| 9,190,062 B2 | 11/2015 | Haughay | |
| 9,190,063 B2 | 11/2015 | Bennett et al. | |
| 9,213,821 B2 | 12/2015 | Saxena et al. | |
| 9,240,955 B1 | 1/2016 | Mukhopadhyay et al. | |
| 9,256,713 B2 | 2/2016 | March et al. | |
| 9,258,306 B2 | 2/2016 | Saxena et al. | |
| 9,262,612 B2 | 2/2016 | Cheyer | |
| 9,262,719 B2 | 2/2016 | Soon-Shiong | |
| 2003/0028469 A1 | 2/2003 | Bergman et al. | |
| 2003/0073939 A1 | 4/2003 | Taylor et al. | |
| 2003/0078838 A1 | 4/2003 | Szmanda | |
| 2004/0030556 A1 | 2/2004 | Bennett | |
| 2004/0117189 A1 | 6/2004 | Bennett | |
| 2004/0193572 A1 | 9/2004 | Leary | |
| 2004/0236580 A1 | 11/2004 | Bennett | |
| 2004/0249618 A1 | 12/2004 | Fine et al. | |
| 2004/0249635 A1 | 12/2004 | Bennett | |
| 2005/0060323 A1 | 3/2005 | Leung et al. | |
| 2005/0080614 A1 | 4/2005 | Bennett | |
| 2005/0086046 A1 | 4/2005 | Bennett | |
| 2005/0086049 A1 | 4/2005 | Bennett | |
| 2005/0086059 A1 | 4/2005 | Bennett | |

(56) References Cited

U.S. PATENT DOCUMENTS

| | | |
|---|---|---|
| 2006/0112048 A1 | 5/2006 | Talbot et al. |
| 2006/0122834 A1 | 6/2006 | Bennett |
| 2006/0122876 A1 | 6/2006 | Von Schweber et al. |
| 2006/0235696 A1 | 10/2006 | Bennett |
| 2006/0256953 A1 | 11/2006 | Pulaski et al. |
| 2007/0005650 A1 | 1/2007 | Coen et al. |
| 2007/0061110 A1 | 3/2007 | Tafazoli et al. |
| 2007/0094209 A1 | 4/2007 | Steward et al. |
| 2007/0094216 A1 | 4/2007 | Mathias et al. |
| 2007/0288405 A1 | 12/2007 | Menich |
| 2007/0288418 A1* | 12/2007 | Pope ............... G06N 7/005 706/53 |
| 2007/0288419 A1 | 12/2007 | Strassner |
| 2007/0288467 A1 | 12/2007 | Strassner et al. |
| 2007/0288795 A1 | 12/2007 | Leung et al. |
| 2008/0015891 A1 | 1/2008 | Lee |
| 2008/0052078 A1 | 2/2008 | Bennett |
| 2008/0059153 A1 | 3/2008 | Bennett |
| 2008/0071714 A1 | 3/2008 | Menich et al. |
| 2008/0109318 A1 | 5/2008 | Szmanda |
| 2008/0140657 A1 | 6/2008 | Azvine et al. |
| 2008/0215327 A1 | 9/2008 | Bennett |
| 2008/0222058 A1 | 9/2008 | Doctor et al. |
| 2008/0255845 A1 | 10/2008 | Bennett |
| 2008/0270336 A1 | 10/2008 | Talbot et al. |
| 2008/0294415 A1 | 11/2008 | de Kleer |
| 2008/0294578 A1 | 11/2008 | de Kleer |
| 2008/0300878 A1 | 12/2008 | Bennett |
| 2008/0306899 A1 | 12/2008 | Gregory et al. |
| 2009/0006320 A1 | 1/2009 | Ding et al. |
| 2009/0018802 A1 | 1/2009 | de Kleer |
| 2009/0018984 A1 | 1/2009 | Solinsky |
| 2009/0070311 A1 | 3/2009 | Feng |
| 2009/0157401 A1 | 6/2009 | Bennett |
| 2009/0164469 A1 | 6/2009 | Becker et al. |
| 2009/0165110 A1 | 6/2009 | Becker et al. |
| 2009/0193493 A1 | 7/2009 | Becker et al. |
| 2009/0222921 A1 | 9/2009 | Mukhopadhyay et al. |
| 2009/0327172 A1 | 12/2009 | Liu et al. |
| 2009/0328133 A1 | 12/2009 | Strassner et al. |
| 2010/0005081 A1 | 1/2010 | Bennett |
| 2010/0010872 A1 | 1/2010 | Drummond et al. |
| 2010/0083056 A1 | 4/2010 | Mills |
| 2010/0205649 A1 | 8/2010 | Becker et al. |
| 2010/0228540 A1 | 9/2010 | Bennett |
| 2010/0235341 A1 | 9/2010 | Bennett |
| 2011/0093463 A1 | 4/2011 | Oliver et al. |
| 2011/0106745 A1 | 5/2011 | Ylonen |
| 2011/0118905 A1 | 5/2011 | Mylaraswamy et al. |
| 2011/0153362 A1 | 6/2011 | Valin et al. |
| 2011/0218855 A1 | 9/2011 | Cao et al. |
| 2011/0231356 A1 | 9/2011 | Vaidyanathan et al. |
| 2011/0289039 A1 | 11/2011 | Ylonen |
| 2011/0289045 A1 | 11/2011 | Ylonen |
| 2011/0314075 A1 | 12/2011 | Boldyrev et al. |
| 2012/0072386 A1 | 3/2012 | Willems et al. |
| 2012/0101793 A1 | 4/2012 | Cheriere et al. |
| 2012/0143013 A1 | 6/2012 | Davis et al. |
| 2012/0158391 A1 | 6/2012 | Vaske et al. |
| 2012/0185330 A1 | 7/2012 | Kleinrock et al. |
| 2012/0185424 A1 | 7/2012 | Vaidyanathan et al. |
| 2012/0197653 A1 | 8/2012 | Short et al. |
| 2012/0197751 A1 | 8/2012 | Zatkin et al. |
| 2012/0197874 A1 | 8/2012 | Zatkin et al. |
| 2012/0203727 A1 | 8/2012 | Schweber et al. |
| 2012/0226650 A1 | 9/2012 | Witchey |
| 2012/0265531 A1 | 10/2012 | Bennett |
| 2012/0301864 A1 | 11/2012 | Bagchi et al. |
| 2013/0054506 A1 | 2/2013 | Hubauer et al. |
| 2013/0110573 A1 | 5/2013 | Pye et al. |
| 2013/0203038 A1 | 8/2013 | Kumar et al. |
| 2013/0204813 A1 | 8/2013 | Master et al. |
| 2013/0211841 A1 | 8/2013 | Ehsani et al. |
| 2013/0212065 A1 | 8/2013 | Rahnama |
| 2013/0212130 A1 | 8/2013 | Rahnama |
| 2013/0310653 A1 | 11/2013 | Zillner et al. |
| 2014/0129504 A1 | 5/2014 | Soon-Shiong |
| 2014/0129557 A1 | 5/2014 | Rahnama |
| 2014/0129693 A1 | 5/2014 | Rahnama |
| 2014/0149337 A1 | 5/2014 | Hubauer et al. |
| 2014/0195664 A1 | 7/2014 | Rahnama |
| 2014/0214460 A1 | 7/2014 | Rahnama |
| 2014/0223561 A1 | 8/2014 | Mitola |
| 2014/0249875 A1 | 9/2014 | Junker et al. |
| 2014/0270467 A1 | 9/2014 | Blemel et al. |
| 2014/0277755 A1 | 9/2014 | Grimm et al. |
| 2014/0358865 A1 | 12/2014 | Brummel et al. |
| 2015/0039648 A1 | 2/2015 | Mukherjee et al. |
| 2015/0046388 A1 | 2/2015 | Sheth et al. |
| 2015/0079556 A1 | 3/2015 | Laitinen |
| 2015/0096026 A1 | 4/2015 | Kolacinski et al. |
| 2015/0142465 A1 | 5/2015 | Vaske et al. |
| 2015/0154178 A1 | 6/2015 | Fang |
| 2015/0199607 A1 | 7/2015 | Fang |
| 2015/0254330 A1 | 9/2015 | Chan et al. |
| 2015/0261825 A1 | 9/2015 | Fischer et al. |
| 2015/0269639 A1 | 9/2015 | Mistriel |
| 2015/0310497 A1 | 10/2015 | Valin et al. |

FOREIGN PATENT DOCUMENTS

| | | |
|---|---|---|
| CN | 101299303 A | 11/2008 |
| CN | 101872345 A | 10/2010 |

OTHER PUBLICATIONS

Aliseda_LLera "Seeking Explanations Abduction in Logic Philosophy of Science and Artificial Intelligence", Dissertation, 1997, (Chapter 2,) pp. 44.*

Jin et al. "Pareto-Based Multiobjective Machine Learning: An Overview and Case Studies", IEEE SMC, vol. 38, No. 3, 2008, pp. 397-415.*

Chinese Office Action (with English language translation) issued in counterpart Chinese Application No. 201280044282.4 dated Jun. 30, 2015.

Baader, Franz and Brandt, Sebastian and Lutz, Carsten: Pushing the EL Envelope. In: Proceedings of the 19th International Joint Conference on Artificial Intelligence (IJCAI 2005). (Professional Book Center, 2005). pp. 364-369. Isbn: 0938075934. (http://www.ijcai.org/papers/0372.pdf).

Skriver, A.J.V. : A classifcation of bicriterion shortest path (bsp) algorithms. Asia-Pacifc Journal of Operational Research 17, pp. 199-212 (2000).

Lecue F. et al.; "Applying Abduction in Semantic Web Service Composition"; WEB SERVICES, 2007. ICWS 2007, IEEE, PI; pp. 94-101; ISBN: 978-0-7695-2924-0; XP031119904; 2007; Jul. 1, 2007.

International Search Report dated Oct. 10, 2012 issued in corresponding International patent application No. PCT/EP2012/062815.

Written Opinion dated Oct. 10, 2012 issued in corresponding International patent application No. PCT/EP2012/062815.

Wang, Huaiqing, Stephen Liao, and Lejian Liao. "Modeling constraint-based negotiating agents" Decision Support Systems 33.2 (2002): 201-217.

Dung, Phan Mink "Negations as Hypotheses: An Abductive Foundation for Logic Programming." ICLP. 1991.

Eco, Umberto. "The Sign of Three: Dupin, Holmes, Peirce Advances in." (1983).

Endriss, Ulrich, et al. "The CIFF proof procedure for abductive logic programming with constraints." Logics in Artificial Intelligence. Springer Berlin Heidelberg, 2004. 31-43.

Ramoni, Marco, et al. "An epistemological framework for medical knowledge-based systems." Systems, Man and Cybernetics, IEEE Transactions on 22.6 (1992): 1361-1375.

Greiner, Russell, Barbara A. Smith, and Ralph W. Wilkerson. "A correction to the algorithm in Reiter's theory of diagnosis." Artificial Intelligence 41.1 (1989): 79-88.

Hobbs, Jerry R. "Abduction in natural language understanding." Handbook of pragmatics (2004): 724-741.

(56) References Cited

OTHER PUBLICATIONS

Harman, Gilbert H. "The inference to the best explanation." The Philosophical Review 74.1 (1965): 88-95.

Pereira, Luís Moniz, Joaquim Nunes Aparício, and José Júlio Alferes. "Hypothetical Reasoning with Well Founded Semantics." SCAI. 1991.

Poole, David. "Representing Diagnostic Knowledge for Probabilistic Horn Abduction." IJCAI. 1991.

Kakas, Antonis C., Robert A. Kowalski, and Francesca Toni. "Abductive logic programming." Journal of logic and computation 2.6 (1992): 719-770.

McIllraith, Sheila. "Generating tests using abduction." Proc. of KR 94 (1994): 449-460.

Baader, Franz, et al. "Matching in description logics." Journal of Logic and Computation 9.3 (1999): 411-447.

Hubauer, Thomas M., Steffen Lamparter, and Michael Pirker. "Relaxed abduction: Robust information interpretation for Incomplete models." 24th International Workshop on Description Logics. 2011.

Poole, David. "Probabilistic Horn abduction and Bayesian networks." Artificial intelligence 64.1 (1993): 81-129.

Poole, David. "Normality and Faults in Logic-Based Diagnosis." IJCAI. vol. 89. 1989.

Dung, Phan Mink "Representing Actions in Logic Programming and Its Applications in Database Updates." ICLP. vol. 93. 1993.

Apt, Krzysztof R., and Marc Bezem. "Acyclic programs." New generation computing 9.3-4 (1991): 335-363.

Console, Luca, Daniele Theseider Dupré, and Pietro Torasso. "A Theory of Diagnosis for Incomplete Causal Models." IJCAI. 1989.

Pirri, Fiora, and Clara Pizzuti. "Explaining incompatibilities in data dictionary design through abduction." Data & knowledge engineering 13.2 (1994): 101-139.

Mayer, Marta Cialdea, and Fiora Pirri "First order abduction via tableau and sequent calculi." Logic Journal of IGPL 1.1 (1993): 99-117.

Bylander, Tom, et al. "The computational complexity of abduction." Artificial intelligence 49.1 (1991): 25-60.

Eshghi, Kave. "A Tractable Class of Abduction Problems." IJCAI. 1993.

Inoue, Katsumi. "Hypothetical reasoning in logic programs." The Journal of Logic Programming 18.3 (1994): 191-227.

Lin, Fangzhen, and Jia-Huai You. "Abduction in logic programming: A new definition and an abductive procedure based on rewriting." Artificial Intelligence 140.1 (2002): 175-205.

Eiter, Thomas, Georg Gottlob, and Nicola Leone. "Semantics and complexity of abduction from default theories." Artificial Intelligence 90.1 (1997): 177-223.

Eiter, Thomas, Georg Gottlob, and Nicola Leone. "Abduction from logic programs: Semantics and complexity." Theoretical computer science 189.1 (1997): 129-177.

Denecker, Marc, and Danny De Schreye. "SLDNFA: an abductive procedure for abductive logic programs." The journal of logic programming 34.2 (1998): 111-167.

Sakama, Chiaki, and Katsumi Inoue. "Abductive logic programming and disjunctive logic programming: their relationship and transferability." The Journal of Logic Programming 44.1 (2000): 75-100.

Kakas, Antonis C., Antonia Michael, and Costas Mourlas. "ACLP: Abductive constraint logic programming." The Journal of Logic Programming 44.1 (2000): 129-177.

Poole, David. "Logic Programming, Abduction and Probability." FGCS. 1992.

Noia, Tommaso Di, et al. "A system for principled matchmaking in an electronic marketplace." International Journal of Electronic Commerce 8.4 (2004): 9-37.

Di Noia, Tommaso, et al. "Abductive matchmaking using description logics." IJCAI. vol. 3. 2003.

McIlraith, Sheila A. "Logic-based abductive inference." Knowledge Systems Laboratory, Technical Report KSL-98-19 (1998).

Denecker, Marc, and Danny De Schreye. "Representing incomplete knowledge in abductive logic programming." Journal of Logic and Computation 5.5 (1995): 553-577.

Sakama, Chiaki, and Katsumi Inoue. "On the Equivalence between Disjunctive and Abductive Logic Programs." ICLP. 1994.

McIlraith, Sheila, and Raymond Reiter. "On tests for hypothetical reasoning." Readings in model-based diagnosis (1992): 89-96.

Eiter, Thomas, and Georg Gottlob. "The complexity of logic-based abduction." Journal of the ACM (JACM) 42.1 (1995): 3-42.

Kowalski, Robert A., Francesca Toni, and Gerhard Wetzel. "Executing suspended logic programs." Fundamenta Informaticae 34.3 (1998): 203-224.

Inoue, Katsumi, and Chiaki Sakama. "Abductive Framework for Nonmonotonic Theory Change." IJCAI. vol. 95. 1995.

Paul, Gabriele. "Approaches to abductive reasoning: an overview." Artificial intelligence review 7.2 (1993): 109-152.

Poole, David. "Representing diagnosis knowledge." Annals of Mathematics and Artificial Intelligence 11.1-4 (1994): 33-50.

Poole, David. "Logic programming, abduction and probability." New Generation Computing 11.3-4 (1993): 377-400.

Kakas, Antonis C., Robert A. Kowalski, and Francesca Toni. "The role of abduction in logic programming." Handbook of logic in artificial intelligence and logic programming 5 (1998): 235-324.

Colucci, Simona, et al. "Concept abduction and contraction for semantic-based discovery of matches and negotiation spaces in an e-marketplace." Electronic Commerce Research and Applications 4.4 (2006): 345-361.

Pople, Harry E. "On the Mechanization of Abductive Logic." IJCAI. vol. 73. 1973.

Denecker, Marc, and Antonis Kakas. "Abduction in logic programming." Computational logic: Logic programming and beyond. Springer Berlin Heidelberg, 2002. 402-436.

Van Nuffelen, Bert. "A-System: Problem solving through abduction." BNAIC'01 Sponsors 1 (2001): 591-596.

Bodlaender, et al. "On the MPA Problem in Probabilistic Networks." BNAIC'01 Sponsors 1 (2001): 71-78.

Hirata, Kouichi. "A classification of abduction: abduction for logic programming." Machine intelligence 14. 1993.

Denecker, Marc, Lode Missiaen, and Maurice Bruynooghe. "Temporal Reasoning with Abductive Event Calculus." ECAI. 1992.

Poole, David. "A logical framework for default reasoning." Artificial intelligence 36.1 (1988): 27-47.

Charniak, Eugene. Introduction to artificial intelligence. Pearson Education India, 1985.

Eiter, Thomas, and Kazuhisa Makino. "On computing all abductive explanations." AAAI/IAAI. 2002.

Josephson, John R., and Susan G. Josephson. Abductive inference: Computation, philosophy, technology. Cambridge University Press, 1996.

Magnani, Lorenzo. "Abductive reasoning: philosophical and educational perspectives in medicine." Advanced models of cognition for medical training and practice. Springer Berlin Heidelberg, 1992. 21-41.

Eshghi, Kave. "Abductive Planning with Event Calculus." ICLP/SLP. 1988.

Ng, Hwee Tou, and Raymond J. Mooney. "On the Role of Coherence in Abductive Explanation3." (1990).

Gentner, Dedre. "Analogical inference and analogical access." Analogica (1988): 63-88.

Hobbs, Jerry R., et al. "Interpretation as abduction." Proceedings of the 26th annual meeting on Association for Computational Linguistics. Association for Computational Linguistics, 1988.

Stickel, Mark E. "A Prolog-like inference system for computing minimum-cost abductive explanations in natural-language interpretation." Annals of Mathematics and Artificial Intelligence 4.1-2 (1991): 89-105.

(56) References Cited

OTHER PUBLICATIONS

Poole, David. "Explanation and prediction: an architecture for default and abductive reasoning." Computational Intelligence 5.2 (1989): 97-110.

Veit, Daniel, et al. "Matchmaking for autonomous agents in electronic marketplaces." Proceedings of the fifth International conference on Autonomous agents. ACM, 2001.

Christiansen, Henning, and Veronica Dahl. "HYPROLOG: A new logic programming language with assumptions and abduction." Logic Programming. Springer Berlin Heidelberg, 2005. 159-173.

Cali, Andrea, et al. "A description logic based approach for matching user profiles." 2004 International Workshop on Description Logics. 2004.

McIlraith, Sheila, and Ray Reiter. "On experiments for hypothetical reasoning." Proc. 2nd International Workshop on Principles of Diagnosis. 1992.

Poole, David. "A methodology for using a default and abductive reasoning system." International Journal of Intelligent Systems 5.5 (1990): 521-548.

* cited by examiner

FIG 1

```
1  foreach r ∈ N_R do
2  |  R (r) ← ∅;
3  foreach C ∈ N_C^⊤ do
4  |  S (C) ← {⊤ : {(∅,∅)}, C : {(∅,∅)}};

// propagation
5  repeat
6  |  changed ← false;
7  |  foreach a ∈ T ∪ A do
   |     // (...)
8  |     if a = ∃r.A_2 ⊑ B then  // CR4
9  |        foreach A_1 ∈ N_C^⊤ s. t. S(A_1) ∋ A_2 : L_{A_1,A_2} do
10 |           foreach A ∈ N_C^⊤ s. t. R(r) ∋ (A, A_1) : L_{A,r,A_1} do
11 |              L ← ∅;
12 |              if S(A) ∋ B : L_{A,B} then   L ← L_{A,B};
13 |              L* ← join(L, meet(L_{A_1,A_2}, L_{A,r,A_1}, a, A ⊑ B));
14 |              if L* ≠ L then
15 |                 S(A) ← (S(A) \ {B : L_{A,B}}) ∪ {B : L*};
16 |                 changed ← true;

|     // (...)
17 until changed = false;
```

ACTUATION OF A TECHNICAL SYSTEM BASED ON SOLUTIONS OF RELAXED ABDUCTION

CROSS-REFERENCE TO RELATED APPLICATIONS

The present application is a 35 U.S.C. §371 national phase application based on PCT/EP2012/062815, filed Jul. 2, 2012, which claims priority of German Patent Application No. 10 2011 079 034.9, filed Jul. 12, 2011, the contents of both of which are incorporated in full by reference herein.

BACKGROUND OF THE INVENTION

The invention relates to a method and an apparatus for actuating a technical system.

Model-based information interpretation (and the application thereof within the framework of model-based diagnosis) is becoming increasingly important. In this context, model-based methods have the advantage of an explicit and comprehensible description of the domain (e.g. of the technical system requiring a diagnosis). Such an explicit model can be examined and understood, which promotes acceptance by the user, particularly in respect of a diagnosis or an interpretation result. In addition, the models can be customized for new machines, extended by new domain knowledge and, depending on the type of presentation, even checked for correctness with reasonable effort. It is also possible to use a vocabulary of the model for man-machine interaction and hence for implementing an interactive interpretation process.

In the case of a logic-based representation of the domain model, the interpretation process is frequently implemented by means of what is known as (logic-based) abduction. This is an attempt to explain the observed information (such as sensor measurements and results from preprocessing processes) by using a formal model. In this context, allowance is made for the fact that the set of observations (e.g. owing to measurement inaccuracies, absence of sensors, etc.) is often incomplete by being able to assume missing information during an explanatory process. In formal terms, the object is thus to determine, for a given model T (also called the "theory") and a set of observations O, a set A of assumptions (usually as a subset $A \subseteq \mathcal{A}$ from all possible assumptions $\mathcal{A}$) such that the observations O are explained by the model T and also the assumptions $A \subseteq \mathcal{A}$. In this case, the problem is worded as an optimization problem, i.e. the "best" such set $A \subseteq \mathcal{A}$ of assumptions is sought (according to the optimality criterion, e.g. the smallest set, or the set with the lowest weight).

In the practice of automatic information interpretation and/or diagnosis, there is—besides the problem of missing observations—also the problem that observations exist that cannot be explained with the given model. Typical causes of this are, by way of example, faulty sensors that deliver measured values outside an envisaged range, or else incomplete models that do not take account of at least one arising combination of observations. Such problems clearly restrict the practical usability of abduction-based information interpretation.

The object of the invention is to avoid the disadvantages cited above and to allow an opportunity for abduction even in the case of erroneous observations.

SUMMARY OF THE INVENTION

The object is achieved by proposing a method for actuating a technical system, in which a relaxed abduction problem is determined,
in which the relaxed abduction problem is solved and the technical system is actuated as appropriate.

In this context, it should be noted that the actuation may relate to or comprise control, diagnosis or other processing of data from the technical system. In particular, the actuation in this case also comprises diagnosis, for example pertaining to the use of the information during a maintenance interval.

As a result of the wording as a multicriterion optimization problem, there is no longer the need to offset assumptions made and observations explained against one another.

The presented approach is highly generic, i.e. it does not require any assumptions about the preference relations used besides the intuitive stipulation that the addition of a further assumption (in the case of an unaltered observation set) cannot improve the preference and the addition of an explained observation (in the case of an unaltered assumption set) cannot impair the preference.

On account of the formal soundness of the approach, it is possible for particular properties of the result set (such as correctness, completeness, etc.) to be checked and substantiated, which is advantageous particularly in safety-critical applications.

Using the choice of underlying representational language and of preference relations, it is possible for the complexity of the problem solving process to be influenced and thus customized to any domain requirements.

One development is that two orders of preference over a subset of the observations and a subset of the assumptions are taken as a basis for determining tuples, so that the theory together with the subset of the assumptions explains the subset of the observations.

This formalizes the intuitive approach of explaining the largest possible portion of observations seen with as few assumptions as possible; in this case, optimality corresponds to pareto-optimality for the two orders of preference (since maximization of the observations and minimization of the assumptions are opposite or different aims). A solution to the problem consists of pareto-optimal pairs (A,O).

The general definition—based on general orders—of the optimality allows the use of various optimality terms, for example minimum and/or maximum number of elements, subset and/or superset relationship, or minimum and/or maximum sum of the weights of the elements contained.

Another development is that the relaxed abduction problem is determined to be RAP=$(T, \mathcal{A}, \mathcal{O}, \leq_A, \leq_O)$, wherein
  the theory T,
  a set of abducible axioms $\mathcal{A}$,
  a set $\mathcal{O}$ of observations,
with
  $T \not\models \mathcal{O}$ and
  the orders of preference $\leq_A \subseteq P(\mathcal{A}) \times P(\mathcal{A})$ and $\leq_O \subseteq P(\mathcal{O}) \times P(\mathcal{O})$ are taken as a basis for determining $\leq$-minimal tuples $(A, O) \in P(\mathcal{A}) \times P(\mathcal{O})$ so that $T \cup A$ is consistent and $T \cup A \models O$ holds.

In this case, the order $\leq$ is based on the orders $\leq_A$ and $\leq_O$ as follows:

$$(A, O) \simeq (A', O') \leftrightarrow A \simeq_A A' \land O \simeq_O O'$$

$$(A, O) < (A', O') \leftrightarrow (A \leq_A A' \land O <_O O') \lor (A <_A A' \land O \leq_O O')$$

$$(A, O) \leq (A', O') \leftrightarrow ((A, O) < (A', O')) \lor ((A, O) \simeq (A', O'))$$

Hence, it is proposed that incorrect and missing information are two complementary facets of defective information and are therefore handled in the same way. In addition to the prerequisite that a required piece of information is based on a set of the assumptions A (also referred to as: abducibles or abducible axioms), the relaxed abduction ignores observations from the set O during production of hypotheses if required.

Accordingly, a good solution has a high level of significance for the observations while being based on assumptions as little as possible. Therefore, advantageously, the order $\leq_A$ is chosen to be monotone and the order $\leq_O$ is chosen to be anti-monotone for subset relationships.

In particular, it is a development that the relaxed abduction problem is solved by transforming the relaxed abduction problem into a hypergraph, so that tuples (A,O) are encoded by pareto-optimal paths in the hypergraph.

It is also a development that the pareto-optimal paths are determined by means of a label approach.

In addition, it is a development that hyperedges of the hypergraph are induced by transcriptions of prescribed rules.

A subsequent development is that the prescribed rules are determined as follows:

$$\frac{A \sqsubseteq A_1}{A \sqsubseteq B}[A_1 \sqsubseteq B \in \mathcal{T}] \quad (CR1)$$

$$\frac{A \sqsubseteq A_1 A \sqsubseteq A_2}{A \sqsubseteq B}[A_1 \sqcap A_2 \sqsubseteq B \in \mathcal{T}] \quad (CR2)$$

$$\frac{A \sqsubseteq A_1}{A \sqsubseteq \exists r \cdot B}[A_1 \sqsubseteq \exists r \cdot B \in \mathcal{T}] \quad (CR3)$$

$$\frac{A \sqsubseteq \exists r \cdot A_1 A_1 \sqsubseteq A_2}{A \sqsubseteq B}[\exists r \cdot A_2 \sqsubseteq B \in \mathcal{T}] \quad (CR4)$$

$$\frac{A \sqsubseteq \exists r_1 \cdot B}{A \sqsubseteq \exists s \cdot B}[r_1 \sqsubseteq s \in \mathcal{T}] \quad (CR5)$$

$$\frac{A \sqsubseteq \exists r_1 \cdot A_1 A_1 \sqsubseteq \exists r_2 \cdot B}{A \sqsubseteq \exists s \cdot B}[r_1 \circ r_2 \sqsubseteq s \in \mathcal{T}]. \quad (CR6)$$

One embodiment is that a weighted hypergraph $H_{RAP}=(V,E)$ that is induced by the relaxed abduction problem is determined by $$V=\{(A \sqsubseteq B),(A \sqsubseteq \exists r \cdot B) | A,B \in N_C^T, r \in N_R\},$$

wherein $$V_T = \{(A \sqsubseteq A),(A \sqsubseteq T) | A \in N_C^T\} \subseteq V$$

denotes a set of final states and E denotes a set of the hyperedges $$e = (T(e),h(e),w(e)),$$

so that the following holds: there is an axiom $a \in T \cup A$ that justifies the derivation $h(e) \in V$ from $T(e) \subseteq V$ on the basis of one of the prescribed rules, wherein the edge weight $w(e)$ is determined according to $$A = \begin{cases} \{a\} & \text{if } a \in A, \\ \emptyset & \text{otherwise} \end{cases}$$

$$O = \begin{cases} \{h(e)\} & \text{if } h(e) \in O, \\ \emptyset & \text{otherwise} \end{cases}$$

An alternative embodiment is that $p_{X,t}=(V_{X,t},E_{X,t})$ is determined as a hyperpath in H=(V,E) from X to t if
(1) $t \in X$ and $p_{X,t}=(\{t\},\emptyset)$ or
(2) there is an edge $e \in E$, so that
$h(e)=t, T(e)=\{y_1 \ldots y_k\}$ holds.
In this case, $p_{X,y_i}|$ are hyperpaths from X to $y_i$:

$$V \supseteq V_{X,t} = \{t\} \cup \bigcup_{y_i \in T(e)} V_{X,y_i},$$

$$E \supseteq E_{X,t} = \{e\} \cup \bigcup_{y_i \in T(e)} E_{X,y_i}.$$

A subsequent embodiment is that shortest hyperpaths are determined by taking account of two preferences.

It is also an embodiment that the shortest hyperpaths are determined by taking account of two preferences by means of a label correction algorithm.

One development is that the labels encode pareto-optimal paths to the hitherto found nodes of the hypergraph.

An additional embodiment is that alterations along the hyperedges are propagated by means of a meet operator and/or by means of a join operator.

Another embodiment is that the relaxed abduction problem is determined by means of a piece of description logic.

The above object is also achieved by means of an apparatus for actuating a technical system comprising a processing unit that is set up such that
a relaxed abduction problem can be determined,
the relaxed abduction problem can be solved and the technical system can be actuated as appropriate.

The processing unit may, in particular, be a processor unit and/or an at least partially hardwired or logic circuit arrangement that, by way of example, is set up such that the method as described herein can be carried out. Said processing unit may be or comprise any type of processor or computer having correspondingly necessary peripherals (memory, input/output interfaces, input/output devices, etc).

The explanations above relating to the method apply to the apparatus accordingly. The apparatus may be embodied in one component or in distributed fashion in a plurality of components. In particular, it is also possible for a portion of the apparatus to be linked via a network interface (e.g. the Internet).

In addition, the object is achieved by proposing a system or a computer network comprising at least one of the apparatuses described here.

The solution presented herein also comprises a computer program product that can be loaded directly into a memory of a digital computer, comprising program code portions that are suitable for carrying out steps of the method described herein.

In addition, the aforementioned problem is solved by means of a computer-readable storage medium, e.g. an arbitrary memory, comprising instructions (e.g. in the form of program code) that can be executed by a computer and that are suited to the computer carrying out steps of the method described here.

The properties, features and advantages of this invention that are described above and also the manner in which they are achieved will become clearer and more distinctly comprehensible in connection with the schematic description of exemplary embodiments that follows, these being explained in more detail in connection with the drawings. In this case, elements that are the same or that have the same action may be provided with the same reference symbols for the sake of clarity.

BRIEF DESCRIPTION OF THE DRAWINGS

FIG. 1 shows a schematic illustration of an algorithm in pseudo-code notation to provide an exemplary explanation of the propagation of the labels on the basis of rule (CR4);

DETAILED DESCRIPTION OF THE INVENTION

Figure 2:
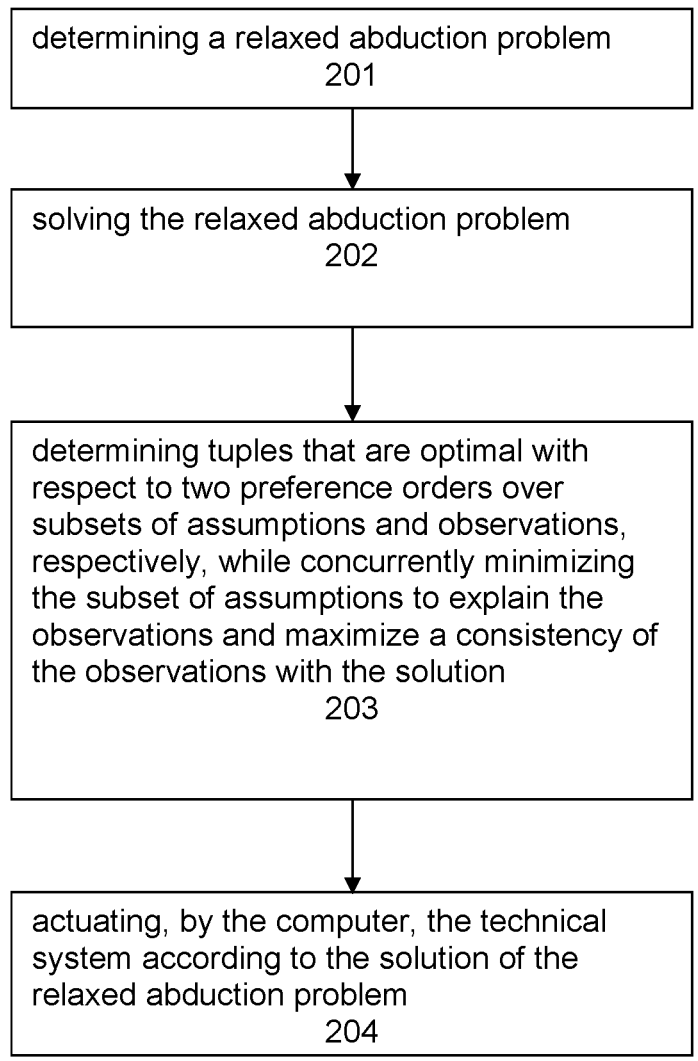
FIG. 2 shows a schematic block diagram with steps of the method proposed herein.

The solution proposed here comprises particularly the following steps:

(1) The definition of the logic-based abduction is formally relaxed so as to obtain important properties of defined problems (such as the verifiability of statements about correctness and existence of solutions, etc).

In particular, a relaxed abduction problem (see below: definition 3) is determined. On the basis of two orders of preference over sets of observations or assumptions, "optimal" pairs (also referred to as tuples) (A,O) (with $A \subset \mathcal{A}$, $O \subset \mathcal{O}$) are now intended to be determined, so that the theory T together with the set of assumptions $A \subset \mathcal{A}$ explains the observations $O \subset \mathcal{O}$, formally: $T \cup A \models O$.

This formalizes the intuitive approach of explaining the largest possible portion of the observations seen with as few assumptions as possible; in this case, optimality corresponds to pareto-optimality for the two orders of preference (since maximization of the observations and minimization of the assumptions are opposite or different aims). A solution to the problem consists of all pareto-optimal pairs (A,O).

The general definition—based on general orders—of the optimality allows the use of various optimality terms, for example minimum and/or maximum number of elements, subset and/or superset relationship, or minimum and/or maximum sum of the weights of the elements contained.

(2) In addition, it is proposed that the specified relaxed abduction problem be solved in a suitable manner. In this context, the relaxed abduction problem is translated into a hypergraph such that optimal pairs (A,O) are encoded by pareto-optimal paths in the induced hypergraph. The optimum paths are determined by using a label approach.

Taken together, these two steps allow solutions to an interpretation problem to be found even when it is not possible to explain all observations.

Overall, the field of application of model-based information interpretation (and hence also of model-based diagnosis) is significantly extended by the approach proposed here, since it is now also possible to process situations with an abundance of observation data (or a defectively formulated model). In this case, the demonstrated solution is conservative, i.e. in cases in which a conventional method delivers a solution, a corresponding solution is also provided by the approach proposed here.

Relaxed abduction with a solution is described in detail below.

Although abductive reasoning over principles of description logic knowledge is applied successfully to various information interpretation processes, it cannot provide adequate (or even any) results if it is confronted by incorrect information or incomplete models. The relaxed abduction proposed here solves this problem by ignoring incorrect information, for example. This can be done automatically on the basis of joint optimization of the sets of explained observations and required assumptions. By way of example, a method is presented that solves the relaxed abduction over $\epsilon\zeta^+$ TBoxes based on the notion of shortest hyperpaths with multiple criteria.

Abduction was introduced in the late 19th century by Charles Sanders Pierce as an inference scheme aimed at deriving potential explanations for a particular observation. The rule formulated in this context $$\frac{\phi \supset \omega\omega}{\phi}$$

can be understood as an inversion of the modus ponens rule that allows $\phi$ to be derived as a hypothetical explanation for the occurrence of $\omega$, under the assumption that the presence of $\phi$ in some sense justifies $\omega$.

This general formulation cannot presuppose any causality between $\phi$ and $\omega$ in this case. Various notions of how $\phi$ justifies the presence of $\omega$ give rise to different notions of abductive inference, such as what is known as a set-cover-based approach, logic-based approaches or a knowledge-level approach.

In particular, the present case deals with logic-based abduction over $\epsilon\zeta^+$ TBoxes. Correspondingly, other logic-based presentation schemes are also possible.

On account of its hypothetical nature, an abduction problem does not have a single solution but rather has a collection of alternative answers $A_1 \ldots A_2, \ldots A_k$, from among which optimal solutions are selected by means of an order of preference "<". The expression $$A_i \leq A_j$$

denotes that $A_i$ is "not worse" that "$A_j$", with an indifference $$A_i \leq A_j \wedge A_j \leq A_i, \text{ where } A_i = A_j$$

and a strict preference $$A_i \leq A_j \wedge A_j \neq A_i \text{ where } A_i < A_j$$

being determined. It is then possible for a (normal) preference-based abduction problem to be defined as follows:

Definition 1: Preference-Based Abduction Problem $$PAP = (T, \mathcal{A}, \mathcal{O}, \leq_\mathcal{A})$$

In view of a set of axioms T, referred as the "theory", a set of abducible axioms $\mathcal{A}$, a set $\mathcal{O}$ of axioms that represent observations, so that $T \models \mathcal{O}$ holds, and a (not necessarily total) order relationship $$\leq_\mathcal{A} \subseteq P(\mathcal{A}) \times P(\mathcal{A})|,$$

all $\leq_\mathcal{A}$-minimal sets $A \subset \mathcal{A}$ are determined, so that $T \cup A$ is consistent and $T \cup A \models \mathcal{O}$ holds.

Typical orders of preference over sets are or comprise subset minimality, $$A_i \leq^s A_j \leftrightarrow A_i \subseteq A_j,$$

minimal cardinality $$A_i \leq^c A_j \leftrightarrow |A_i| \leq |A_j| \text{ or}$$

weighting-based orders, which are defined by a function $\omega$ which assigns numerical weights to subsets of A $$A_i \leq^w A_j \leftrightarrow w(A_i) \leq w(A_j).$$

The first two orders of preference give preference to a set A over any of its subsets; this monotonicity property is formalized in definition 2 below.

Definition 2: monotone and anti-monotone order

An order ≤(<) over sets is monotone (strictly monotone) for a subset relationship if $S' \subseteq S$ implies S'≤S (or $S' \subset S$ implies S'<S).

Conversely, an order ≤(<) is anti-monotone (strictly anti-monotone) for a subset relationship if $S' \supseteq S$ implies S'≤S ($S' \supset S$ implies S'<S).

Applications of abductive information interpretation using a formal domain model include media interpretation and diagnostics for complex technical systems such as production machines. These domains have many, in some cases simple, observations on account of a large number of sensors, whereas the model for all of these observations is often inadequately or incompletely specified. The following example illustrates how the classical definition of abduction can fail in a specific situation:

Example

Sensitivity to Incorrect Information

A production system comprises a diagnosis unit, wherein the production system has been mapped using a model. The model indicates that a fluctuating supply of current is manifested by intermittent failures in a main control unit, while the communication links remain operational and a mechanical gripper in the production system is unaffected (the observations are deemed to be modeled as a causal consequence of the diagnosis).

It is now assumed that a new additional vibration sensor observes low-frequency vibrations in the system. If the diagnostic model has not yet been extended in respect of this vibration sensor, which means that the observations of the vibration sensor also cannot be taken into account, the low-frequency vibrations delivered by the vibration sensor will unsettle the diagnostic process and prevent effective diagnosis in relation to the supply of current, even though the data delivered by the vibration sensor could actually be totally irrelevant.

Hence, the extension of the system by the vibration sensor results in the diagnosis no longer working reliably.

This flaw is based—according to the above definition of the preferred abduction problem—on the need for an admissible solution to have to explain every single observation $o_i \in O|$. This severely restricts the practical applicability of logic-based abduction to real industry applications in which an ever greater number of sensor data items produce and provide information that is not (yet) taken into account by the model.

An extension of logic-based abduction is therefore proposed below, so that even a wealth of data provide the desired results, e.g. diagnoses, flexibly and correctly.

Relaxed Abduction

Whereas, for simple models, it is still possible for incorrect information to be identified and possibly removed in a preprocessing step with a reasonable amount of effort, this is not possible for many real and correspondingly complex models, also because the relevance of a piece of information is dependent on the interpretation thereof and hence is not known in advance.

Hence, it is proposed that incorrect and missing information are two complementary facets of defective information and are therefore handled in the same way. In addition to the prerequisite that a required piece of information is based on the set of the assumptions A (also referred to as: abducibles or abducible axioms), the relaxed abduction ignores observations from the set O during production of hypotheses if required. This is formalized in definition 3.

Definition 3: Relaxed Abduction Problem $$RAP = (T, A, O, \leq_A, \leq_O)$$

On the basis of a set of axioms T, referred to as the "theory", a set of abducible axioms A, a set O of axioms that represent observations, so that $T|\neq O$ holds, and two (not necessarily total) order relationships $$\leq_A \subseteq P(A) \times P(A) \text{ and}$$

$$\leq_O \subseteq P(O) \times P(O),$$

all ≤-minimal tuples $$(A, O) \in P(A) \times P(O)$$

are determined, so that $T \cup A$ is consistent and $T \cup A| = O$ holds.

In this case, the order <| is based on the orders $\leq_A$ and $\leq_O$ as follows:

$$(A, O) \simeq (A', O') \leftrightarrow A \simeq_A A' \wedge O \simeq_O O'$$

$$(A, O) < (A', O') \leftrightarrow (A \leq_A A' \wedge O <_O O') \vee (A <_A A' \wedge O \leq_O O')$$

$$(A, O) \leq (A', O') \leftrightarrow ((A, O) < (A', O')) \vee (A, O) \simeq (A', O'))$$

Accordingly, a good solution has a high level of significance for the observations while being based on assumptions as little as possible. Therefore, advantageously, the order $\leq_A$ is chosen to be monotone and the order $\leq_O$ is chosen to be anti-monotone for subset relationships.

Using inclusion as an order criterion over sets, the following will hold:

$$A \leq_A A' \leftrightarrow A \subseteq A' \text{ and}$$

$$O \leq_O O' \leftrightarrow O \supseteq O'.$$

For the example cited above with the augmented vibration sensor, a minimal solution that explains all observations apart from the vibrations is obtained on the basis of the order. Therefore, this vibration is not taken into account in the diagnosis, which allows the fluctuating supply of current to be indicated as the result of the diagnosis.

Assertion 1: Conservativeness:

$A \subseteq A$ is a solution for the preference-based abduction problem $PAP = (T, A, O, \leq_A)$ if $(A, O)$ is a solution to the relaxed abduction problem $RAP = (T, A, O, \leq_A, \leq_O)$, specifically for any order $\leq_O$, which is anti-monotone for the subset relationship.

Evidence:

It is assumed that A solves the preferred abduction problem $PAP = (T, A, O, \leq_A)$. The following then holds:

$T \cup A$ is consistent $T \cup A| = O$ and

A is $\leq_A$-minimal.

Since the order $\leq_O$ for the subset relationship is anti-monotone, O is also $\leq_O$-minimal; (A,O) is therefore ≤-minimal and hence solves the relaxed abduction problem RAP.

Conversely, the following holds: if (A,O) solves the relaxed abduction problem RAP, then the following holds:

$T \cup A$ is consistent $T \cup A| = O$ and (A,O) is ≤-minimal.

If it is assumed that $A \leq_A A'$ holds, so that it follows that: $A \subseteq A'$, $T \cup A'$ is consistent and $T \cup A' \models O$, then it holds that: $(A',O)<(A,O)$, which is inconsistent with the $\leq$-minimality of $(A,O)$.

Conservativeness states that under ordinary circumstances relaxed abduction provides all solutions (provided that there are some) to the corresponding standard abduction problem (i.e. the nonrelaxed abduction problem). Since the $\leq_A$-order and the $\leq_O$-order are typically competing optimization aims, it is expedient to treat relaxed abduction as an optimization problem with two criteria. $\leq$-Minimal solutions then correspond to pareto-optimal points in the space of all combinations (A,O) that meet the logical requirements of a solution (consistency and explanation of the observations).

Assertion 2: Pareto-Optimality of RAP:

Let RAP=$(T,A,O,\leq_A,\leq_O)$ be a relaxed abduction problem. $(A^*,O^*)$ is a solution to the relaxed abduction problem RAP if it is a pareto-optimal element (on the basis of the orders $\leq_A$ and $\leq_O$) in the solution space $$\{(A,O) \in P(A) \times P(O) | T \cup A \models O \wedge T \cup A \not\models \bot\}.$$

Evidence:

If $(A^*,O^*)$ solves the relaxed abduction problem RAP, then it holds that:

$T \cup A^*$ is consistent and $T \cup A^* \models O^*$.

$(A^*,O^*)$ is therefore an element of the explanation space (ES); in addition, $(A^*,O^*)$ is $\leq$-minimal.

It is now assumed that $(A^*,O^*)$ is not pareto-optimal for ES, and also that $(A',O') \in ES$, so that (without loss of generality) $A'<_A A^*$ and $O'<_O O^*$ hold.

This would result in $(A',O')<(A^*,O^*)$.

which would be inconsistent with $\leq$-minimality of $(A^*, O^*)$. Hence, $(A^*,O^*)$ is a pareto-optimal element of the explanation space ES.

Similarly, $(A',O')$ is a pareto-optimal element of the explanation space ES. In order to show that the tuple is $\leq$-minimal, let $(A^*,O^*)$ be a solution to a relaxed abduction problem RAP, so that the following holds:

$$(A^*,O^*)<(A',O')$$

Without loss of generality, this gives $A^*<_A A'$ and $O^*<_O O'$, which is inconsistent with the pareto-optimality of $(A',O')$. Therefore, $(A',O')$ must be $\leq$-minimal and hence solves the relaxed abduction problem RAP.

The next section provides an approach in order to solve a relaxed abduction. This approach is based on the simultaneous optimization of $\leq_A$ and $\leq_O$.

Solving Relaxed Abduction

The description logic $\epsilon\zeta^+$ is a member of the $\epsilon\zeta$ family, for which a subsumption can be verified in PTIME. $\epsilon\zeta^+$ concept descriptions are defined by $$C ::= T | A | C \sqcap C | \exists r.C$$

(where $A \in N_C$ is a concept name and $r \in N_R$ is a role name). $\epsilon\zeta^+$ axioms are concept inclusion axioms $C \sqcap D$ or role inclusion axioms $r_1 \circ \ldots \circ r_k \sqsubseteq r$ with C, D concept descriptions; $r, r_1, \ldots, r_k \in N_R$, $k \geq 1$. In this case, $N_C$ denotes the set of concept names and $N_R$ denotes the set of role names.

Since any $\epsilon\zeta^+$ TBox can be normalized with only a linear increase in magnitude, it holds that all axioms have one of the following (normal) forms:

$$A_1 \sqsubseteq B \qquad \text{(NF1)}$$

$$A_1 \sqcap A_2 \sqsubseteq B \qquad \text{(NF2)}$$

$$A_1 \sqsubseteq \exists r.B \qquad \text{(NF3)}$$

$$\exists r.A_2 \sqsubseteq B \qquad \text{(NF4)}$$

$$r_1 \sqsubseteq s \qquad \text{(NF5)}$$

$$r_1 \circ r_2 \sqsubseteq s \qquad \text{(NF6)}$$

for $A_1, A_2, B \in N_C^T = N_C \cup \{T\}$ and $r_1, r_2, s \in N_R$.

Accordingly, (NF1) describes a concept inclusion "all objects in a class $A_1$ are also objects in a class B". (NF2) describes: "if an object belongs to class $A_1$ and to class $A_2$ then it also belongs to class B". This can be shortened to "$A_1$ and $A_2$ are implied by B". (NF3) denotes: "if an object belongs to class $A_1$ then it is linked to at least one object in class B via a relation r". Accordingly, (NF4) describes: "if an object is linked to at least one object in class $A_2$ by means of a relation r then said object belongs to class B". The normal forms (NF5) and (NF6) are obtained accordingly for the roles $r_1, r_2, s \in N_R$.

In addition to standard refutation-based table reasoning, the $\epsilon\zeta$ family allows a completion-based reasoning scheme that explicitly derives valid subsumptions, specifically using a set of rules in the style of Gentzen's sequent calculus (also called "Gentzen calculus").

The rules (completion rules CR and initialization rules IR) are presented below:

$$\frac{A \sqsubseteq A_1}{A \sqsubseteq B}[A_1 \sqsubseteq B \in \mathcal{T}] \qquad \text{(CR1)}$$

$$\frac{A \sqsubseteq A_1 \; A \sqsubseteq A_2}{A \sqsubseteq B}[A_1 \sqcap A_2 \sqsubseteq B \in \mathcal{T}] \qquad \text{(CR2)}$$

$$\frac{A \sqsubseteq A_1}{A \sqsubseteq \exists r.B}[A_1 \sqsubseteq \exists r.B \in \mathcal{T}] \qquad \text{(CR3)}$$

$$\frac{A \sqsubseteq \exists r.A_1 \; A_1 \sqsubseteq A_2}{A \sqsubseteq B}[\exists r.A_2 \sqsubseteq B \in \mathcal{T}] \qquad \text{(CR4)}$$

$$\frac{A \sqsubseteq \exists r_1.B}{A \sqsubseteq \exists s.B}[r_1 \sqsubseteq s \in \mathcal{T}] \qquad \text{(CR5)}$$

$$\frac{A \sqsubseteq \exists r_1.A_1 \; A_1 \sqsubseteq \exists r_2.B}{A \sqsubseteq \exists s.B}[r_1 \circ r_2 \sqsubseteq s \in \mathcal{T}] \qquad \text{(CR6)}$$

$$\overline{A \sqsubseteq A} \qquad \text{(IR1)}$$

$$\overline{A \sqsubseteq \mathcal{T}} \qquad \text{(IR2)}$$

A graph structure which is produced using the rules allows subsumptions to be derived.

By way of example, it is assumed that both the set of assumptions A and the set of observations O, like the theory T, are axioms of the description logic.

The axiom-oriented representation allows a high level of flexibility and reuse of information.

From Completion Rules to Hypergraphs

Since the rules shown above are a complete evidence system for $\epsilon\zeta^+$, any normalized axiom set can accordingly be mapped as a hypergraph (or as an appropriate representation of such a hypergraph), the nodes of which are axioms of type (NF1) and (NF3) over the concepts and the role names that are used in the axiom set (in line with all statements that are admissible as a premise or conclusion in a derivation step).

Hyperedges of the hypergraph are induced by transpositions of the rules (CR1) to (CR6); by way of example, an instantization of the rule (CR4), which derives $C \sqsubseteq F$ from $C \sqsubseteq \exists r.D$ and $D \sqsubseteq E$ using the axiom $\exists r.E \sqsubseteq F$, induces a hyperedge $$\{C \sqsubseteq \exists r.D, D \sqsubseteq E\} \rightarrow C \sqsubseteq F.$$

This correspondence can also be extended to relaxed abduction problems as follows: Both T and A contain arbitrary $\epsilon \zeta^+$ axioms in normal form that can justify individual derivation steps represented by a hyperedge (in order to simplify the representation, it can be assumed that $A \cap T = \emptyset$ holds).

Elements from the set of all observations O, on the other hand, represent information that is to be justified (i.e. that is derived), and therefore correspond to nodes of the hypergraph. This requires axioms from O to be only of type (NF1) and (NF3); this is a restriction that is usable in practice, since (NF2) axioms and (NF4) axioms can be converted into an (NF1) axiom, specifically using a new concept name, and since role inclusion axioms are not needed in order to express observations about domain objects. Preferably, the hyperedges are provided with a label on the basis of this criterion. This is also evident from the definition below.

Definition 4: Induced Hypergraphs $H_{RAP}$:
Let RAP=$(T,A,O,\leq_A,\leq_O)$ be a relaxed abduction problem. A weighted hypergraph $H_{RAP}=(V,E)$, which is induced by RAP, is defined by $$V = \{(A \sqsubseteq B), (A \sqsubseteq \exists r.B) | A, B \in N_C^T, r \in N_R\}|,$$

$$V_T = \{(A \sqsubseteq A), (A \sqsubseteq T) | A \in N_C^T\} \subseteq V$$

denotes the set of final states and E denotes the set of all hyperedges $$e = (T(e), h(e), w(e)),$$

so that the following holds:
There is an axiom $a \in T \cup A$ that justifies the derivation $h(e) \in V$ from $T(e) \subseteq V$ on the basis of one of the rules (CR1) to (CR6). The edge weight w(e) is defined by $$A = \begin{cases} \{a\} & \text{if } a \in A, \\ \emptyset & \text{otherwise} \end{cases}$$

$$O = \begin{cases} \{h(e)\} & \text{if } h(e) \in O, \\ \emptyset & \text{otherwise} \end{cases}$$

In this context, it should be noted that the magnitude of $H_{RAP}$ is bounded polynomially in $|N_C|$ and $|N_R|$. Checking whether a concept inclusion $D \sqsubseteq E(C \sqsubseteq \exists r.D)$ can be derived also checks whether the graph contains a hyperpath from $V_T$ to the node $D \sqsubseteq E(C \sqsubseteq \exists r.D)$.

Intuitively, there is a hyperpath from X to t if there is a hyperedge that connects a particular set of nodes Y to t, and each $y_i \in Y|$ can be reached from X via a hyperpath. This is formalized using the definition below.

Definition 5: Hyperpath:
$p_{X,t} = (V_{X,t}, E_{X,t})$ is a hyperpath in $H=(V,E)$ from X to t| if
(1) $t \in X$ and $p_{X,t} = (\{t\}, \emptyset)$ or
(2) there is an edge $e \in E$, so that
$h(e) = t, T(e) = \{y_1, \ldots, y_k\}$ holds.
In this case $p_{X,y_i}$ are hyperpaths from X to $y_i$:

$$V \supseteq V_{X,t} = \{t\} \cup \bigcup_{y_i \in T(e)} V_{X,y_i},$$

$$E \supseteq E_{X,t} = \{e\} \cup \bigcup_{y_i \in T(e)} E_{X,y_i}.$$

Hyperpath Search for Relaxed Abduction

This section provides an exemplary explanation of an algorithm for solving the relaxed abduction problem RAP. This involves determining the shortest hyperpaths by taking into account two different criteria (multi-aim optimization).

Thus, an extended label correction algorithm for finding shortest paths using two criteria in a graph is proposed on the basis of [Skriver, A. J. V.: A classification of bicriterion shortest path (bsp) algorithms. Asia-Pacific Journal of Operational Research 17, pages 199-212 (2000)]. Thus, the graph is presented in a compact form using two lists S and R (see also: Baader, F., Brandt, S., Lutz, C.: Pushing the EL envelope. In: Proceedings of the 19$^{th}$ International Joint Conference on Artificial Intelligence. Pages 364-369 (2005)). The entries in the list are extended by labels that encode the pareto-optimal paths to the previously found node. Alterations are propagated along the weighted edges using
 a meet operator ($\otimes$ operator) and
 a join operator ($\otimes$ operator).
In this case, the meet operator is defined as follows:

| Function: meet ($L_1$, $L_2$, just concl) | | |
|---|---|---|
| Input parameters: | $L_1$ | Label set |
| | $L_2$ | Label set |
| | just | Axiom in normal form |
| | concl | Axiom in normal form |
| Output parameter: | | Label set for the meet operator$\otimes$ |
| Result ← $\{A_1 \cup A_2, O_1 \cup O_2) | (A_1, O_1) L_1, (A_2, O_2) \in L_2\}$; | | |
| if just ∈ A then result ← $\{(A \cup \{just\}, O) | (A, O) \in result\}$; | | |
| if concl ∈ O then ←$\{(A, O) \cup \{concl\}, O) | (A, O) \in result\}$ | | |
| return result; | | |

The join operator can be defined as follows:

| Function: join ($L_1$, $L_2$) | | |
|---|---|---|
| Input parameters | $L_1$ | Label set |
| | $L_2$ | Label set |
| Output parameter | | Label set for the join operator$\otimes$ |
| result ← $L_1 \cup L_2$: | | |
| result ← remove_dominated (result,$\leq_A, \leq_O$); | | |
| return result: | | |

In this context, it should be noted that the "remove_dominated" functionality removes those labels that code relatively poor paths.

When saturation has been reached, the labels of all <-| minimal paths in $H_{RAP}$ are collected in the set $$MP(H_{RAP}) := \cup_{v \in V} \text{label}(v).$$

FIG. 1 shows a schematic illustration of an algorithm in pseudo code notation for the exemplary explanation of the propagation of the labels on the basis of the rule (CR4).

As already explained, the algorithm shown in FIG. 1 is used to produce the labels for the hyperpath of the relaxed abduction problem. In lines 1 to 4, initialization takes place and in the subsequent lines of the code fragment shown, the labels are assigned and alterations to the labels are propagated.

In line 7, all axioms a from T and A are selected in order and for each of these axioms a check is performed to determine whether the individual rules (CR1) to (CR6) apply. This is shown by way of example from line 8 onward for the rule (CR4). If need be, a new label L* is added in line 13 and a check is performed in line 14 to determine whether the label has been changed. If this is the case, the previous label entry is removed in line 15. Accordingly, the labels are added or updated.

In line 17, a check is performed to determine whether saturation has occurred, i.e. no further change is needed to be taken into account.

In this context, it should be noted that even though the order of propagations is irrelevant to correct ascertainment, it can have a significant effect on the number of candidates produced: finding almost optimal solutions may already result in a large number of less-than-optimal solutions in good time, which can be rejected. To improve performance, it is thus possible to use heuristics by first of all exhaustively applying propagations that are determined by elements of T and introducing assumptions only if such propagations are not possible.

Assertion 3: Correctness:

The set of all solutions for a relaxed abduction problem RAP=(T,A,O,$\leq_A$,$\leq_O$) is indicated by a $\leq$I-minimal closure of MP(H$_{RAP}$) under component-wise union as per $(A,O) \uplus (A',O') := (A \cup A', O \cup O')$.

Evidence:

Hyperpaths in H$_{RAP}$ that begin at V$_T$ are derivations. Labels that are constructed on the basis of these hyperpaths can be used in order to encode relevant information that is used during this derivation. According to assertion 2, it is sufficient to show that the proposed algorithm correctly determines the labels for all pareto-optimal paths in H$_{RAP}$ that begin at V$_T$.

This can be verified inductively on the basis of the correctness of the meet and join operators. This closing synopsis of $\cup_{v \in V}$label(v) as a component-wise union is based on the insight that, since the two statements a and b have been verified, it is evidently possible to verify a ∧ b by combining the two items of evidence using the meet operator. In graphical terms, this can be regarded as addition of the associated node T, so that any other v∈V is connected to the node T by means of a hyperedge ({v}, T, {∅,∅}). The label for this node then encodes all solutions to the relaxed abduction problem, and is calculated as indicated above.

Since the node labels can grow exponentially with the magnitude A and O, it is worthwhile, for general orders of preference such as the set inclusion, considering the advantage of the present method in comparison with a brute force approach: iteration is performed over all pairs (A,O)∈P(A)× P(O), and all tuples (A,O) are collected, so that T∪A⊨O holds; finally, all $\leq$-dominant tuples are eliminated. This approach requires $2^{|A|+|O|}$ deducibility tests, with each set that passes this test being tested for $\leq$-minimality. The solution presented is superior to a brute force approach in several respects:

a) in contrast to the uninformed brute force search outlined above, the approach proposed in this paper realizes an informed search as it does not generate all possible (A,O) pairs at random but rather only those for which the property T∪A⊨O actually holds, without requiring any additional deducibility tests. The overall benefit of this property is dependent on the model of T and on the sets A and O. Problems that have only a few solutions therefore benefit most from the present proposal.

b) Dropping $\leq$-dominated labels for $\leq_A$ and $\leq_O$|, which are (anti-)monotone for set inclusion, reduces the worst case magnitude of node labels by at least a factor $O(\sqrt{|A|\cdot|O|})$.

c) In addition to the upper limits for the magnitude of labels, it is also possible for the expected number of non-dominated paths to a state to be determined as follows: two arbitrary orders over elements of A and O are assumed, so that any subset can be encoded directly as a binary vector of length |A| or |O|. For this, it is possible to deduce that the labels grow on average only in the order of magnitude $1.5^{|A|+|O|}$ instead of $2^{|A|+|O|}$.

Other selections for $\leq_A$ and $\leq_O$| can lead to more considerable savings of computation effort, since the orders of preference are used as a pruning criterion while the solution is generated. This allows the present approach to be used for approximation.

If, by way of example, the assumption set and the observation set are compared not by means of set inclusion but rather by means of cardinality, the maximum label magnitude is decreased to |A|·|O|. This could—depending on the order of the rule application—not result in optimal solutions, however.

In a more complex design, e.g. for an installation or a technical system, it is possible to allocate numerical weights for observations and/or abducible axioms so that only such solutions as are substantially poorer than others are dropped. Alternatively, it is possible to use weights (or scores) in order to calculate limits for a maximum number of points that can be achieved by a partial solution; this number of points can be used as pruning criterion.

Hence, the present approach provides an opportunity for relaxed abduction for a description logic. Relaxed abduction extends logic-based abduction by the option of interpreting incorrect information for incomplete models. A solution to relaxed abduction over $\epsilon\zeta^+$ knowledge bases is presented on the basis of pareto-optimal hyperpaths in the derivation graph. The performance of this approach also has critical advantages over that of mere enumeration despite the inherent exponential growth of node labels.

The proposed algorithm can accordingly be applied to other description logics for which it is possible to determine subsumption by means of completion. This is the case for the $\epsilon\zeta^{++}$ description logic, for example.

The relaxed abduction described in the present case allows various specializations that are obtained from various selection options for $\leq_A$ and $\leq_O$. By way of example, approximated solutions can be generated very efficiently (i.e. with a linear label magnitude) if set cardinality is used as a dominance criterion. It is also possible for the axioms to have weights allocated in order to allow early or even lossless pruning of less-than-optimum partial solutions; in this case, the label magnitudes are also reduced.

FIG. 2 shows a schematic block diagram with steps of the method proposed herein: In a step 201, a relaxed abduction problem is determined for the technical system, e.g. on the basis of data from measurement pickups or sensors or other capturable data relating to the technical system. In a step 202, the relaxed abduction problem is solved by determining tuples that are optimal with respect to two preference orders over subsets of assumptions and observations, respectively, while concurrently minimizing the subset of assumptions to explain the observations and maximize a consistency of the observations with the solution 203. In a step 204, the technical system is actuated according to the solution of the relaxed abduction problem.

The technical system may be a technical installation, assembly, process monitoring, a power station or the like.

Figure 3:
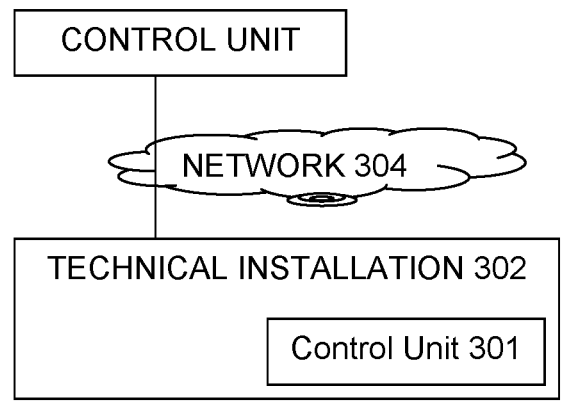
FIG. 3 shows a schematic block diagram with control units for actuating a technical installation.

FIG. 3 shows a schematic block diagram with a control unit 301 that is arranged by way of example within a technical installation 302. In addition, a control unit 303 is provided, which is arranged separately from the technical installation 302 and is connected thereto via a network 304, for example the Internet. Both control units 301, 303 can be used in order to actuate the technical system 302; in particular, it is possible for at least one of the control units 301, 303 to carry out diagnosis for the technical system 302 and/or to set parameters for the technical system 302.

Although the invention has been illustrated and described in more detail using the at least one exemplary embodiment shown, the invention is not restricted thereto and other variations can be derived therefrom by a person skilled in the art without departing from the scope of protection of the invention.

The invention claimed is:

1. A method of actuating a technical system, the method comprising:
    receiving at least one observation from at least one sensor;
    determining, by a computer which is configured to execute program code stored on a non-transitory computer-readable medium, a relaxed abduction problem;
    solving, by the computer, the relaxed abduction problem, by determining tuples that are optimal with respect to two preference orders over subsets of assumptions and observations, wherein the determined optimal tuples comprise a subset of observations smaller than a complete set of observations, respectively, that concurrently minimize the subset of assumptions to explain the observations comprising the at least one observation received from the at least one sensor and maximize the subset of observations abductively explained by the subset of assumptions given a theory T, with the objective of determining a causal consequence of the largest possible portion of observations with as few assumptions as possible; and
    actuating the technical system according to the solution of the relaxed abduction problem by communicating at least one actuator signal.

2. The method as claimed in claim 1, in which the relaxed abduction problem is determined to be $RAP=(T,A,O,\circ_A,\circ_O)$, wherein:
    a set of abducible axioms is A,
    a set of observations is O
    with
    T'/O; and
    further comprising taking orders of preference $$\circ_A \subseteq P(A) \times P(A) \text{ and}$$

$$\circ_O \subseteq P(O) \times P(O)$$

as a basis for determining $\circ$-minimal tuples $(A,O) \in P(A) \times P(O)$,
so that $T \cup A$ is consistent and $T \cup A'O$ holds.

3. The method as claimed in claim 1, wherein the relaxed abduction problem is solved by transforming the relaxed abduction problem into a hypergraph, so that the tuples (A,O) are encoded by pareto-optimal paths in the hypergraph.

4. The method as claimed in claim 3, wherein the pareto-optimal paths are determined via a label approach.

5. The method as claimed in claim 3, further comprising inducing hyperedges of the hypergraph by transcriptions of prescribed rules.

6. The method as claimed in claim 5, wherein the prescribed rules are determined as follows:

$$\frac{A \hat{o} A_1}{A \hat{o} B} [A_1 \hat{o} B \in T] \quad (CR1)$$

$$\frac{A \hat{o} A_1 A \hat{o} A_2}{A \hat{o} B} [A_1 \cap A_2 \hat{o} B \in T] \quad (CR2)$$

$$\frac{A \hat{o} A_1}{A \hat{o} \exists r.B} [A_1 \hat{o} \exists r \cdot B \in T] \quad (CR3)$$

$$\frac{A \hat{o} \exists r \cdot A_1 A_1 \hat{o} A_2}{A \hat{o} B} [\exists r \cdot A_2 \hat{o} B \in T] \quad (CR4)$$

$$\frac{A \hat{o} \exists r_1 \cdot B}{A \hat{o} \exists s \cdot B} [r_1 \hat{o} s \in T] \quad (CR5)$$

$$\frac{A \hat{o} \exists r_1 \cdot A_1 A_1 \hat{o} \exists r_2 \cdot B}{A \hat{o} \exists s \cdot B} [r_1 \circ r_2 \hat{o} s \in T]. \quad (CR6)$$

7. The method as claimed in claim 3, wherein a weighted hypergraph $H_{RAP}=(V,E)$ which is induced by the relaxed abduction problem, is determined by $$V = \{(A \hat{o} B), (A \exists r.B) | A, B \in N_C^T, r \in N_R\},$$

wherein $$V_T = \{(A \hat{o} A), (A \hat{o} T) | A \in N_C^1\} \subseteq V$$

denotes a set of final states and E denotes a set of the hyperedges $$e = (T(e), h(e), w(e)),$$

so that the following holds: an axiom $a \in T \cup A$ exists that justifies derivation $h(e) \in V$ from $T(e) \subseteq V$ based on one of the prescribed rules,
wherein the edge weight w(e) is determined according to $$A = \begin{cases} \{a\} & \text{if } a \in A, \\ \emptyset & \text{otherwise} \end{cases}$$

$$O = \begin{cases} \{h(e)\} & \text{if } h(e) \in O \\ \emptyset & \text{otherwise} \end{cases}.$$

8. The method as claimed in claim 7, wherein $p_{X,t}=(V_{X,t}, E_{X,t})$ is determined as a hyperpath in H=(V,E) from X to t if
    (1) $t \in X$ and $p_{X,t}=(\{t\},0)$ or
    (2) there is an edge $e \in E$, so that $h(e)=t, T(e)=(y_1, \ldots, y_k)$ holds.

9. The method as claimed in claim 8, wherein shortest hyperpaths are determined by taking account of two preferences.

10. The method as claimed in claim 9, wherein the shortest hyperpaths are determined by taking account of the two preferences via a label correction algorithm.

11. The method as claimed in claim 10, wherein the labels encode pareto-optimal paths to the hitherto found nodes of the hypergraph.

12. The method as claimed in claim 11, wherein alterations along the hyperedges are propagated by a meet operator and/or by a join operator.

13. The method as claimed in claim 1, wherein the relaxed abduction problem is determined via a piece of description logic.

14. A computer system for actuating a technical system, comprising:
    a processor configured to automatically execute program code stored on a non-transitory computer-readable medium, to:
        control receipt of at least one observation from at least one sensor;

determine a relaxed abduction problem;

solve the relaxed abduction problem by determining tuples that are optimal with respect to two preference orders over subsets of assumptions and observations, wherein the determined optimal tuples comprise a subset of observations smaller than a complete set of observations, respectively, that concurrently minimize the subset of assumptions to explain the observations comprising the at least one observation received from the at least one sensor and maximize the subset of observations abductively explained by the subset of assumptions given a theory T, with the objective of determining a causal consequence of the largest possible portion of observations with as few assumptions as possible; and an actuator output port configured to actuate the technical system according to the solution of the relaxed abduction problem.

15. The computer as claimed in claim 14, in which the relaxed abduction problem is determined to be:

$$RAP=(T,A,O,\circ_A,\circ_O),$$

wherein:
a set of abducible axioms is A,
a set of observations is O
with T'/O; and
further comprising taking orders of preference $$\circ_A \subseteq P(A) \times P(A) \text{ and}$$

$$\circ_O \subseteq P(O) \times P(O)$$

as a basis for determining ∘-minimal tuples $(A,O) \in P(A) \times P(O)$,
so that T∪A is consistent and T∪A'O holds.

16. The computer as claimed in claim 14, wherein the processor is configured to solve the relaxed abduction problem by transforming the relaxed abduction problem into a hypergraph, so that the tuples (A,O) are encoded by pareto-optimal paths in the hypergraph.

17. The computer as claimed in claim 16, wherein the processor is further configured to automatically induce hyperedges of the hypergraph by transcriptions of prescribed rules determined as follows:

$$\frac{A\hat{o}A_1}{A\hat{o}B}[A_1\hat{o}B \in T] \quad (CR1)$$

$$\frac{A\hat{o}A_1 A\hat{o}A_2}{A\hat{o}B}[A_1 \cap A_2 \hat{o}B \in T] \quad (CR2)$$

$$\frac{A\hat{o}A_1}{A\hat{o}\exists r\cdot B}[A_1\hat{o}\exists r\cdot B \in T] \quad (CR3)$$

$$\frac{A\hat{o}\exists r\cdot A_1 A_1\hat{o}A_2}{A\hat{o}B}[\exists r\cdot A_2\hat{o}B \in T] \quad (CR4)$$

-continued $$\frac{A\hat{o}\exists r_1 \cdot B}{A\hat{o}\exists s \cdot B}[r_1\hat{o}s \in T] \quad (CR5)$$

$$\frac{A\hat{o}\exists r_1 \cdot A_1 A_1\hat{o}\exists r_2 \cdot B}{A\hat{o}\exists s \cdot B}[r_1 \circ r_2\hat{o}s \in T]. \quad (CR6)$$

18. The computer as claimed in claim 16, wherein the processor is further configured to determine a weighted hypergraph $H_{RAP}=(V,E)$ induced by the relaxed abduction problem: $V=\{(A\hat{o}B),(A,\exists r.B)|A,B\in N_C^T, r\in N_R\}$,
wherein:
$V_T=\{(A\hat{o}A), (A\hat{o}T)|A\in N_C^1\} \subseteq V$ denotes a set of final states, and E denotes a set of the hyperedges $e=(T(e),h(e),w(e))$, so that the following holds: an axiom $a\in T\cup A$ exists that justifies derivation $h(e)\in V$ from $T(e)\subseteq V$ based on one of the prescribed rules, wherein the edge weight w(e) is determined according to $$A = \begin{cases} \{a\} & \text{if } a \in A \\ 0 & \text{otherwise} \end{cases}$$

$$O = \begin{cases} \{h(e)\} & \text{if } h(e) \in O \\ 0 & \text{otherwise} \end{cases}.$$

19. A method of controlling a technical system, comprising:
receiving at least one observation from at least one sensor;
determining a relaxed abduction problem;
determining a pareto-optimum set of tuples (A,O) by taking as a basis two orders of preference over a subset of observations (O) smaller than a complete set of observations, and a subset of assumptions (A), so that a theory (T) together with a minimized subset of the assumptions (A) explains a maximized subset of the observations (O) comprising the at least one observation (O) received from the at least one sensor, with the objective of determining a causal consequence of the largest possible portion of subset of observations (O) with as few members of the subset of assumptions (A) as possible;
defining a solution to the determined relaxed abduction problem, by an automated computer which executes program code stored on a non-transitory computer-readable medium; and
actuating the technical system in accordance with the defined solution.

20. The method according to claim 19, further comprising transforming the relaxed abduction problem into a hypergraph, so that the tuples (A,O) are encoded by pareto-optimal paths in the hypergraph.

* * * * *